(12) United States Patent
Ferrar et al.

(10) Patent No.: US 12,679,034 B2
(45) Date of Patent: Jul. 14, 2026

(54) APPARATUS AND METHOD FOR PRODUCING AN ARTICLE BY ADDITIVE MANUFACTURING

(71) Applicant: LPW TECHNOLOGY LIMITED, Widnes (GB)

(72) Inventors: Ben Ian Ferrar, Alsagar (GB); Nicholas Paul Weeks, Over Peover (GB); Philip Anthony Carroll, Lymm (GB)

(73) Assignee: LPW TECHNOLOGY LIMITED, Widnes (GB)

( * ) Notice: Subject to any disclaimer, the term of this patent is extended or adjusted under 35 U.S.C. 154(b) by 0 days.

(21) Appl. No.: 17/048,250

(22) PCT Filed: Apr. 16, 2019

(86) PCT No.: PCT/GB2019/051084
§ 371 (c)(1),
(2) Date: Oct. 16, 2020

(87) PCT Pub. No.: WO2019/202312
PCT Pub. Date: Oct. 24, 2019

(65) Prior Publication Data
US 2021/0154936 A1 May 27, 2021

(30) Foreign Application Priority Data

Apr. 17, 2018 (GB) ...................................... 1806273

(51) Int. Cl.
B29C 64/357 (2017.01)
B22F 10/28 (2021.01)
(Continued)

(52) U.S. Cl.
CPC ............ B29C 64/357 (2017.08); B22F 10/28 (2021.01); B22F 10/34 (2021.01); B22F 10/73 (2021.01);
(Continued)

(58) Field of Classification Search
CPC ... B29C 64/357; B29C 64/153; B29C 64/245; B29C 64/329; B29C 64/336;
(Continued)

(56) References Cited

U.S. PATENT DOCUMENTS

2006/0214335 A1 9/2006 Cox
2010/0161102 A1 6/2010 Mattes et al.
(Continued)

FOREIGN PATENT DOCUMENTS

DE 20107262 8/2001
DE 20107262 U1 * 8/2001 ............. B29C 41/52
(Continued)

OTHER PUBLICATIONS

EOS, EPO Machine Translation of DE-20107262-U1 (Year: 2001).*

*Primary Examiner* — Seyed Masoud Malekzadeh
(74) *Attorney, Agent, or Firm* — Day Pitney LLP; George Chaclas; Anthony A. Kassas

(57) ABSTRACT

The present invention relates to an apparatus for producing an article by additive manufacturing comprising a first container and a second container from which powder may be selectively dispensed to form an article, wherein the first container and the second container contain the same type of powder and wherein the containers respectively contain powder that has been recycled to different extents.

9 Claims, 5 Drawing Sheets

(51) Int. Cl.

| | |
|---|---|
| *B22F 10/34* | (2021.01) |
| *B22F 10/73* | (2021.01) |
| *B22F 12/52* | (2021.01) |
| *B22F 12/55* | (2021.01) |
| *B22F 12/58* | (2021.01) |
| *B29C 64/153* | (2017.01) |
| *B29C 64/245* | (2017.01) |
| *B33Y 10/00* | (2015.01) |
| *B33Y 30/00* | (2015.01) |

(52) U.S. Cl.
CPC .............. *B22F 12/52* (2021.01); *B22F 12/55* (2021.01); *B22F 12/58* (2021.01); *B29C 64/153* (2017.08); *B33Y 10/00* (2014.12); *B29C 64/245* (2017.08); *B33Y 30/00* (2014.12)

(58) Field of Classification Search
CPC ......... B33Y 10/00; B33Y 30/00; B22F 12/52; B22F 12/55; B22F 8/00; B22F 12/58
See application file for complete search history.

(56) References Cited

U.S. PATENT DOCUMENTS

| | | | | |
|---|---|---|---|---|
| 2015/0258705 A1 | 9/2015 | Hirata | | |
| 2016/0193696 A1* | 7/2016 | Mcfarland | .......... | B23K 26/342 219/76.12 |
| 2017/0252806 A1* | 9/2017 | Wienberg | .......... | B23K 26/0853 |
| 2018/0339466 A1* | 11/2018 | El Naga | .................. | B22F 10/34 |
| 2019/0084235 A1* | 3/2019 | Roure Pastor | ........ | B01F 35/832 |
| 2019/0134897 A1* | 5/2019 | Williams | .............. | B33Y 30/00 |
| 2019/0270136 A1* | 9/2019 | Gibson | .................... | B22F 3/10 |
| 2021/0154936 A1* | 5/2021 | Ferrar | ................... | B33Y 10/00 |

FOREIGN PATENT DOCUMENTS

| | | | | | |
|---|---|---|---|---|---|
| JP | 2006248231 A | 9/2006 | | | |
| JP | 2012510390 A | 5/2012 | | | |
| WO | 2018/017069 | 1/2018 | | | |
| WO | WO-2018017069 A1 * | 1/2018 | ............. | G06F 30/20 | |

* cited by examiner

APPARATUS AND METHOD FOR PRODUCING AN ARTICLE BY ADDITIVE MANUFACTURING

CROSS-REFERENCE TO RELATED APPLICATIONS

This application is the U.S. national phase entry under 35 U.S.C. § 371 of International Application No. PCT/GB2019/051084, filed Apr. 16, 2019, entitled APPARATUS AND METHOD FOR PRODUCING AN ARTICLE BY ADDITIVE MANUFACTURING, which in turn claims priority to and benefit of Great Britain Application No. 1806273.7, filed Apr. 17, 2018 of which each is incorporated herein by reference in their entirety for all purposes.

TECHNICAL FIELD OF THE INVENTION

The present invention relates to an apparatus and method for producing an article by additive manufacturing.

BACKGROUND TO THE INVENTION

In a known additive manufacturing (AM) process an AM machine produces articles from a powdered material, such as a metal or alloy. The machine deposits a layer of powder on a build platform and the powder is subsequently selectively fused or otherwise solidified, typically with a laser or electron beam, to form an article or articles. The process is repeated so that articles are formed layer by layer.

During a build operation unfused powder is subject to degradation. A metal powder may gradually oxidise, for example, which alters its properties and thus those of an article produced from the powder. The tendency of a powder to oxidise typically increases with temperature, and exposure to temperature may also affect other powder properties.

Despite unfused powder containing degraded particles it is typical within the industry to re-use the unfused powder in another build. However, it will be appreciated that as powder is recycled the content of degraded particles in the powder being dispensed will increase, and that if degraded particles accumulate in regions of the article that will be subjected to stress in use, then there is an increased likelihood of the article failing in that region.

In light of the above it is an object of embodiments of the present invention to provide an apparatus and method that enables a user to selectively deliver powder containing a reduced content of degraded particles to pre-determined regions of an article being produced. It is also an object of embodiments of the present invention to provide an apparatus and a method that affords a user improved control over how recycled powder is utilised in a build operation. It is another object of embodiments of the present invention to provide a more economic route for producing an article through additive manufacturing.

SUMMARY OF THE INVENTION

According to a first aspect of the invention there is provided an apparatus for producing an article by additive manufacturing, the apparatus comprising a first container and a second container from which powder may be selectively dispensed to form an article, wherein the first container and the second container contain the same type of powder and wherein the containers respectively contain powder that has been recycled to different extents.

Since the apparatus is configured to enable the respective powders to be dispensed independently from the first and second containers rather than as a blend containing unspecified amounts of each powder, the ratio of the powder dispensed from the first container and from the second container can be optimised and varied in dependence on the predicted stress in one or more regions of the article being formed. This also has the benefit of reducing manufacturing costs because, generally speaking, powders which have been recycled to a lesser extent or not at all are more expensive because they contain reduced quantities of degraded particles that could lead to failure of the article, and by being able to selectively dispense these more expensive powders in regions where they are needed, i.e. in regions of the article that are likely to experience increased levels of stress in use, rather than using them to produce the article in its entirety, a user is afforded a more economic route to producing the article. Moreover, because the powder which has been recycled to a lesser extent can be dispensed in greater quantities in regions where the article is likely to experience higher levels of stress, a lower proportion of degraded particles will be present in said regions, meaning that there is a reduced likelihood of the article failing in that region during use. Further, since the first container and the second container contain the same type of powder, with the only difference being the extent to which the respective powders have been recycled, the articles thus formed are understood to exhibit a reduced number of defects relative to articles that are formed from different types of powders.

In the context of the present invention "recycled powder" may be defined as powder that has been exposed to one or more AM build cycles and is re-used in one or more further AM build cycles.

In some embodiments the first container may contain non-recycled powder and the second container may contain powder that has been recycled one or more times. Accordingly, it will be appreciated that the non-recycled powder is "virgin" powder that has not been subjected to the conditions of a build operation.

In an alternative embodiment the first container and the second container may both contain recycled powder. As an example, the first container could contain powder that has been recycled once while the second container may contain powder that has been recycled two or more times.

The first and second containers may each comprise means for controlling the flow of powder from the first and second containers. For instance, the first and second containers may each comprise a valve for controlling the flow of powder out of the container. In particular, the valve may be an electronic valve.

The apparatus may be arranged to dispense powder from the first container and/or powder from the second container onto a build platform. In particular, the apparatus may be arranged to dispense powder from the first container and/or powder from the second container directly onto the build platform.

In some embodiments, the apparatus may be arranged to dispense powder from the first container and/or powder from the second container onto the build platform via a third container. The third container may be configured to enable mixing of the first powder and the second powder.

In another embodiment powder from the first container and/or powder from the second container is dispensed onto the build platform via respective delivery platforms. The delivery platforms may be moveable in the y-direction. Preferably, the delivery platforms are piston driven.

The apparatus may comprise a control unit operable to control the ratio of powder dispensed from the first container and from the second container. In particular, the ratio of powder dispensed from the first container and from the second container may be varied in dependence on predicted stress in a region of the article. It will appreciated that while the apparatus is configured to enable delivery of powder from the first and second containers, in certain instances, and depending on the requirements of the build, powder may be dispensed from a single container only rather than from both containers.

The control unit may be configured so that the ratio of powder dispensed from the first container and the second container is varied for each layer of the article.

The apparatus may comprise a wiper operable to form a layer of powder on the build platform. The wiper may be arranged above the build platform. Preferably the wiper is moveable from a first position to a second positon above the build platform. The wiper may be moved back and forth as often as necessary until a layer of powder having uniform thickness is obtained on the build platform.

The apparatus may also comprise means for selectively melting powder in the layer. For instance, the apparatus may comprise a laser beam or an electron beam.

In some embodiments powder in the first container and powder in the second container may comprise a metal or a metal alloy. For example, the powder may comprise titanium metal or a titanium alloy such as Ti-6Al-4V.

According to a second aspect of the invention there is provided a method of producing an article by additive manufacturing which comprises the step of selectively dispensing a first powder and/or a second powder to produce the article, wherein the first powder and the second powder have been recycled to different extents and are of the same type of powder.

In some embodiments the first powder may comprise non-recycled powder and the second powder may comprise powder that has been recycled one or more times. Alternatively, the first powder and the second powder may both comprise recycled powders that have been recycled to different extents.

Mixing of the first powder and the second powder may occur once the powders have been dispensed onto a build platform. This for instance may be achieved by moving a wiper across the build platform from a first position to a second position. Preferably the wiper is spaced above the build platform. The wiper can be moved back and forth across the build platform as often as necessary in order to form a layer of powder having a substantially uniform thickness.

The method may comprise the step of performing a stress analysis to predict stress in regions of the article and varying the ratio of the first powder to the second powder in dependence on the predicted stress in that region.

In some embodiments the ratio of the first powder to the second powder may be varied in dependence on the predicted stress in that region and on either a predicted or analysed condition of the recycled powder.

The ratio of the first powder to the second powder in one layer may be the same or different to the ratio of the first powder to the second powder in a previous layer.

According to a third aspect of the invention there is provided an apparatus for producing an article by additive manufacturing comprising a first container and a second container from which powder may be selectively dispensed to form an article, wherein the first container and the second container contain the same type of powder, the containers respectively contain powder that has been recycled to different extents and wherein the ratio of powder dispensed from the first container and from the second container is varied in dependence on predicted stress in a region of the article.

The apparatus according the third aspect of the invention may, as appropriate, contain any or all features described in relation to the first and second aspects of the invention.

DETAILED DESCRIPTION OF THE INVENTION

In order that the invention may be more clearly understood one or more embodiments thereof will now be described, by way of example only, with reference to the accompanying drawings, of which:

Figure 1:
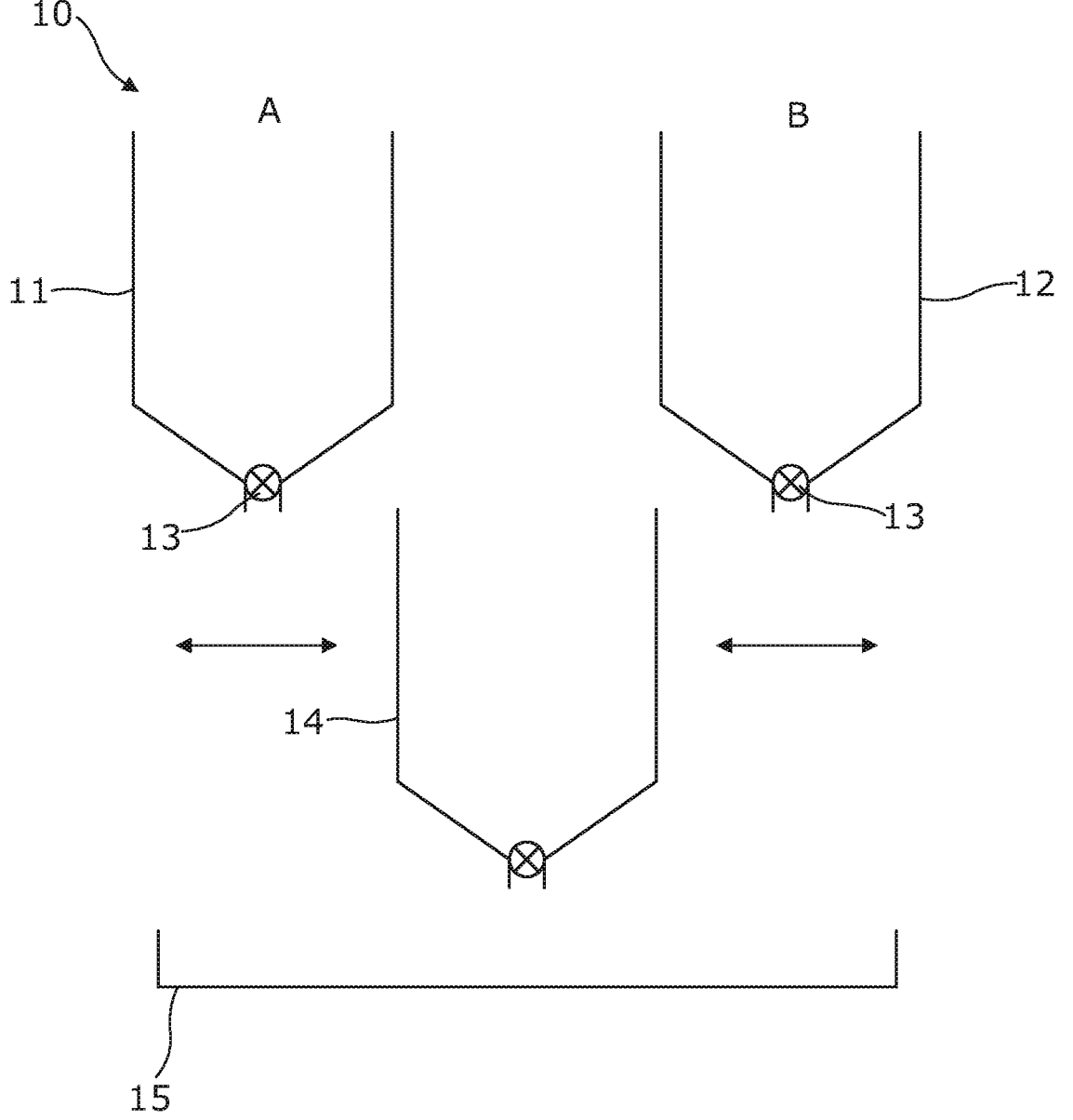
FIG. 1 shows a first example of an apparatus for additive manufacturing an article in accordance with the present invention.
Figure 2:
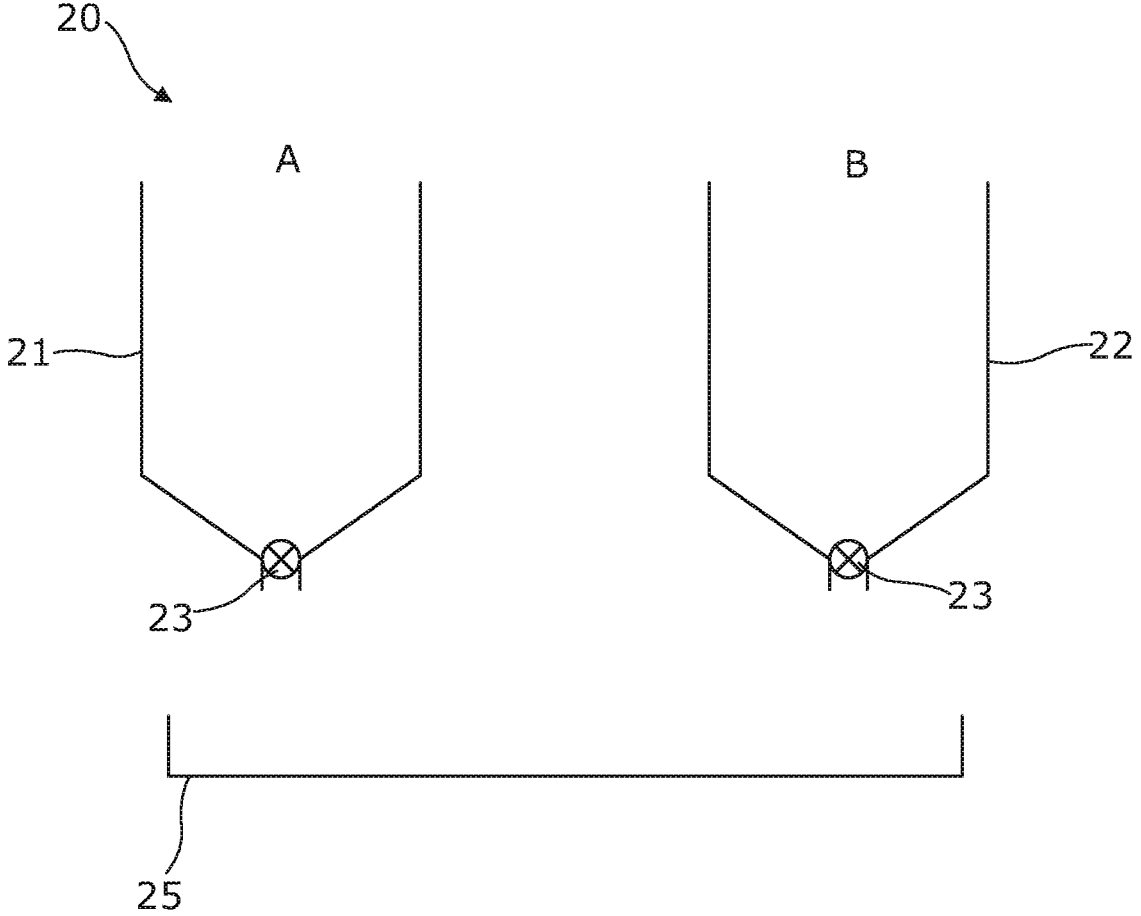
FIG. 2 shows a second example of an apparatus for additive manufacturing an article in accordance with the present invention.

Referring to FIG. 1 and in one exemplary embodiment of the invention there is provided an apparatus 10 for producing an article by additive manufacturing.

The apparatus 10 comprises a first container 11 and a second container 12 which are configured to hold and dispense powder. The containers 11, 12 are funnel shaped at their respective lower ends and an electronic valve 13, configured to control the flow of powder from the respective containers 11, 12, is provided in the funnel portion of each container 11, 12. The electronic valve 13 is controlled by a control unit (not shown) which is in communication with both the electronic valve 13 and a personal computer or similar device.

In this example the first container 11 and the second container 12 both contain titanium powder. More specifically, the first container 11 contains titanium powder that has not been recycled (powder A), whereas the second container 12 contains titanium powder that has been recycled at least once (powder B), i.e. the first and second containers 11, 12 contain the same type of powder, the only difference being the extent to which the respective powders have been recycled.

A third container 14 is arranged below the first and second containers 11, 12. The third container 14 has an open upper end for receiving titanium powder from the first and/or second containers 11, 12 and a funnel-shaped lower end through which powder is dispensed via an electronic valve 13. In this example the third container 14 is moveable to a position below the first container 11 and/or to a position below the second container 12 so that titanium powder can be selectively dispensed from the first container 11 and/or from the second container 12 into the third container 14 as required.

A build platform 15 located below the third container 14 is configured to move in the y-direction. Arranged above the build platform is a wiper in the form of a blade. The wiper is moveable from a first position in which the wiper is held clear of the powder to a second position in which the wiper engages the powder. The wiper is also operable for spreading powder across the build platform 15 to form a layer of powder having a substantially uniform thickness. In particular, the wiper is operable to move from one side of the build platform 15 to the other once the wiper has been brought into engagement with the powder on the build platform 15.

The apparatus 10 also comprises a heat source for selectively melting powder particles within a given layer into a pre-determined shape. In this example the heat source is a laser beam, but it will be appreciated that electron beam, microwave or plasma heat sources could alternatively be used.

Prior to commencing the additive manufacturing process a 3D model of the article to be produced is generated using computer aided design (CAD) software on a personal computer or similar device. The CAD model is then subjected to finite element analysis (FEA) which is a computerised method for predicting how a product reacts under various physical conditions such as stress. Accordingly, FEA enables a user to predict regions of strain and stress in the product and possible areas where the product could fail during use. The CAD files are then converted into .STL files which can be understood into the additive manufacturing apparatus 10. The 3D model generated by the CAD software is then sliced electronically to obtain a series of 2D layers, which each define a planer cross section through the model of the article. Numerical stress values obtained from the FEA analysis are then reviewed and analysed for each of the layers in order to identify the highest numerical stress value, i.e. the worst case scenario, for each layer. Using this information, reference data relating to the degradation behavior of titanium powder and the application requirements of the article being produced, a user or an algorithm is able to determine an appropriate mix ratio of powder A and powder B for each layer. The mix ratio for each layer is stored on the personal computer or similar device.

In a first step of the additive manufacturing process, the computer outputs a signal to the control unit to open the electronic valve 13 of the first container 11 to enable powder A to flow from the first container 11 into the third container 14. The third container 14 then moves to a position below the second 12 container and the electronic valve 13 associated with the second container 14 is opened to enable powder B to flow into the third container 14. The respective valves 13 of the first and second containers 11, 12 are opened for a pre-determined period of time in order to obtain the desired mix ratio of powder A to powder B. As discussed above, the ratio of powder A to powder B is varied in dependence on the predicted stress in a region of the article, also taking into account the degradation behavior of powder B. It therefore follows that the powder blend will contain a greater proportion of powder A when the predicted stress in a certain region of the article is high, whereas the powder blend will contain a greater proportion of powder B in regions when the predicted stress in a region of the article is low. It will be appreciated that in certain instances the powder may contain 100% of powder A or 100% of powder B depending on the predicted stress in a particular region and the application requirements of the article being built.

Dispensing powder A and powder B into the third container 14 promotes mixing of the respective powders before they are dispensed onto the build platform 15. To dispense the powder blend the control unit outputs a signal to open the electronic valve 13 associated with the third container 14 which enables the powder to be dispensed onto the build platform 15 at a pre-determined rate. As the powder blend is being dispensed, the third container 14 moves back and forth so that a layer of the blended powder is formed on the build platform 15.

To ensure that the layer of blended powder has a substantially uniform thickness, the wiper is brought into engagement with the powder and is then moved back and forth so that powder is spread across the build platform 15 until the desired layer thickness is obtained. The wiper is then retracted and held out of contact with the powder. In forming the layer of blended powder it will be appreciated that a proportion of the blended powder will be wiped from the surface of the build platform. This powder is collected in collection chambers located either side of the build platform so that this unfused powder can be re-used.

Selected regions of powder corresponding with the desired shape of the article are then irradiated with a laser beam which causes particles in the layer to fuse and form a solid mass on cooling. Another layer of powder is then dispensed from the third container 14 and the above described process of forming a layer with uniform layer thickness and irradiating selected regions with a laser beam is repeated until the article is formed. It is will be appreciated that the ratio of powder A to powder B in each subsequent layer may be the same or different to the previous layer and that the ratio will depend on the predicted stress in that particular region of the article as determined by the FEA analysis.

In a second example of the invention there is provided an apparatus 20 that is similar to the apparatus 10 shown in FIG. 1, except that it does not comprise the third container 14. Accordingly, rather than dispensing powder from the first container 11 and/or from the second container 12 into the third container 14, powder is dispensed from the first container 21 and/or from the second container 22 directly onto the build platform 25 via electronic valves 23. The dispensed powder is then mixed as it is spread across the surface of the build platform 25 using the wiper. This has the benefit that powder from the first and second containers 21, 22 can be dispensed in certain regions on the build platform 25 or underlying layer so that those regions possess a higher concentration of powder A or powder B after the powder has been spread across the surface of the build platform 25.

Figure 5:
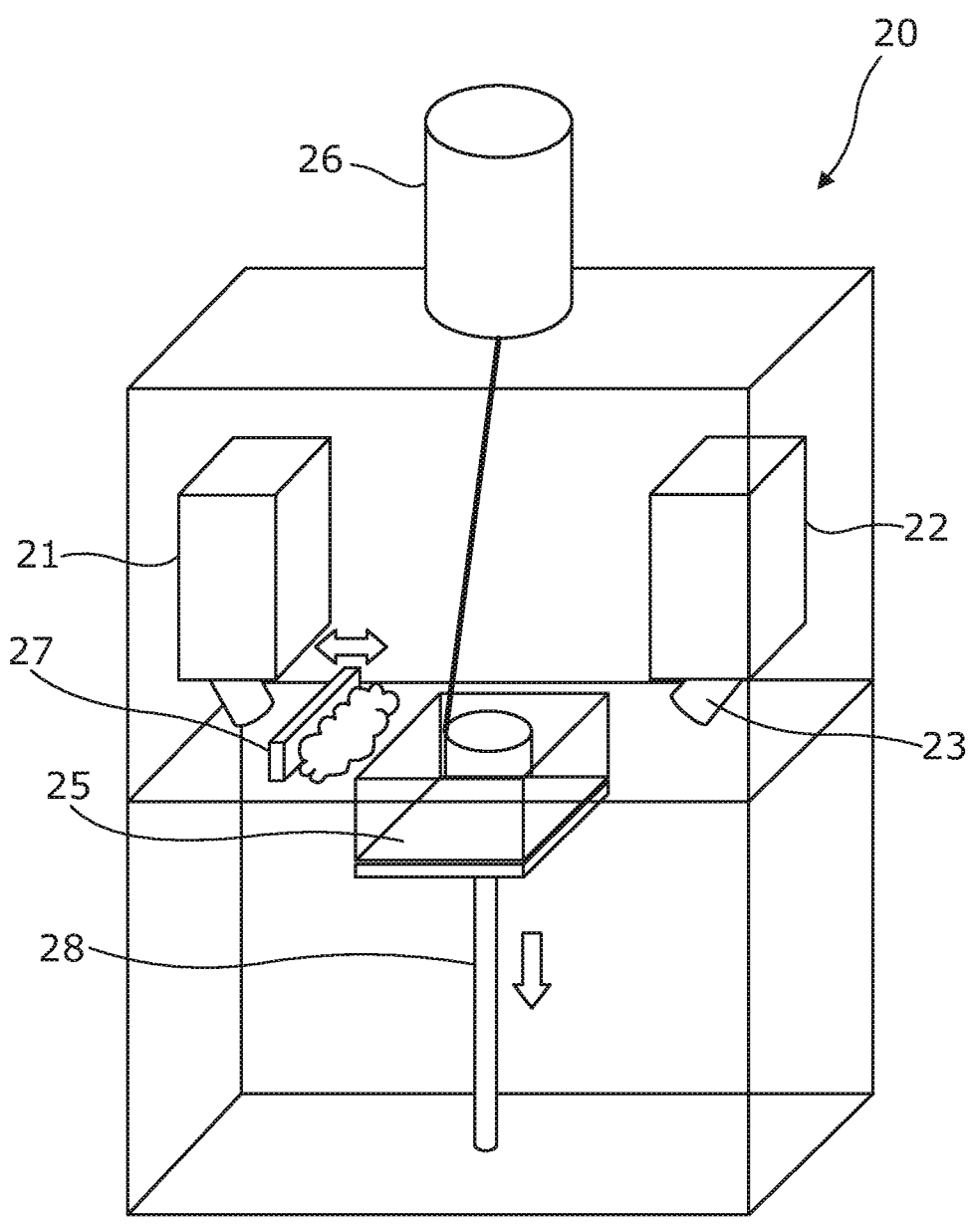
FIG. 5 shows a more detailed example of an apparatus for additive manufacturing an article.

FIG. 5 shows a more detailed example of an apparatus 20 for producing an article by additive manufacturing. The apparatus 20 comprises a laser beam 26 for irradiating selected regions of powder on the build platform 25, a first container 21 for containing powder A, a second container 22 for containing powder B, a wiper 27 which is operable to form a layer of metal powder on the build platform 25 and a building screw 28 for lowering the build platform during the build.

Figure 3:
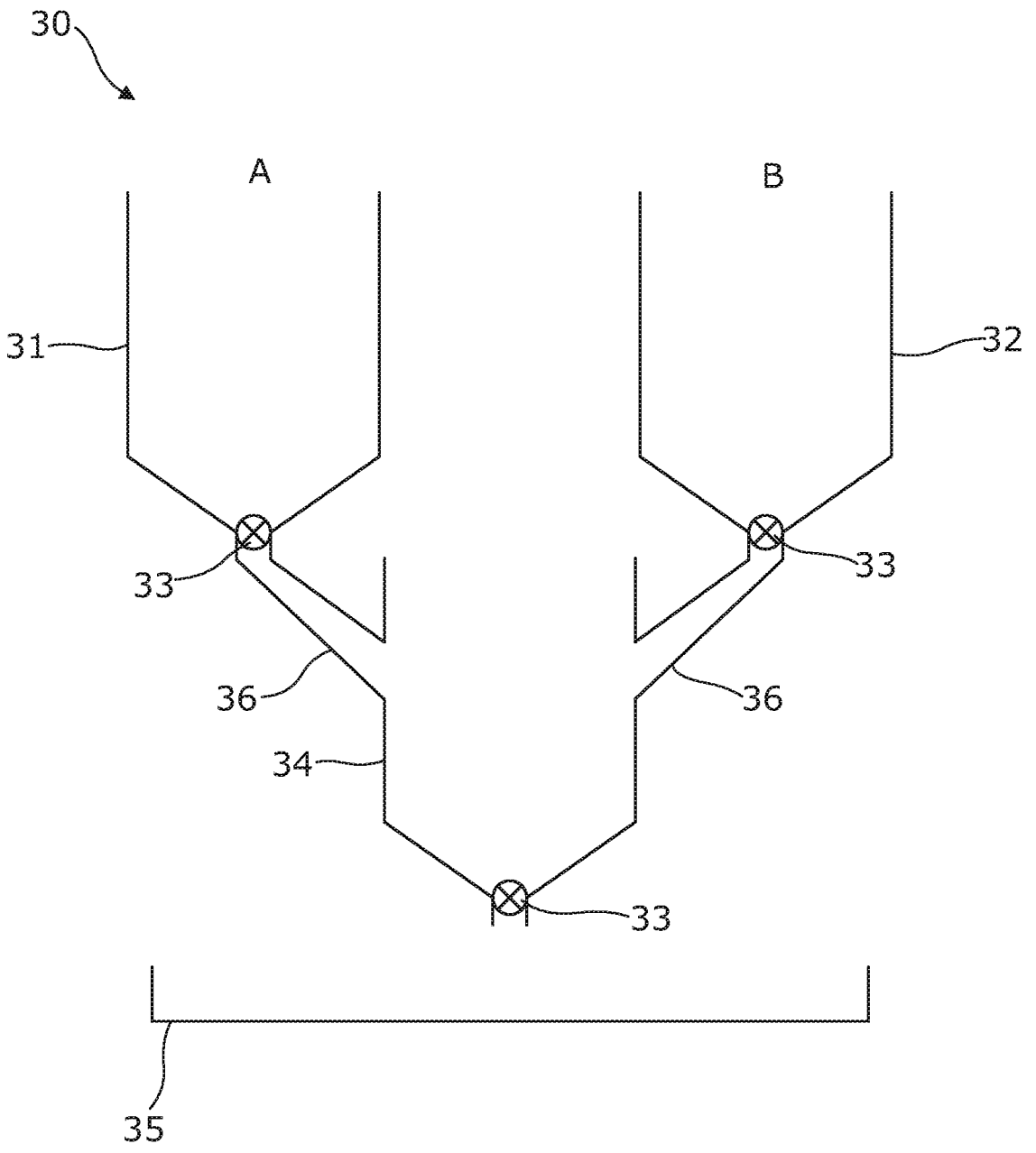
FIG. 3 shows a third example of an apparatus for additive manufacturing an article in accordance with the present invention.
Figure 4:
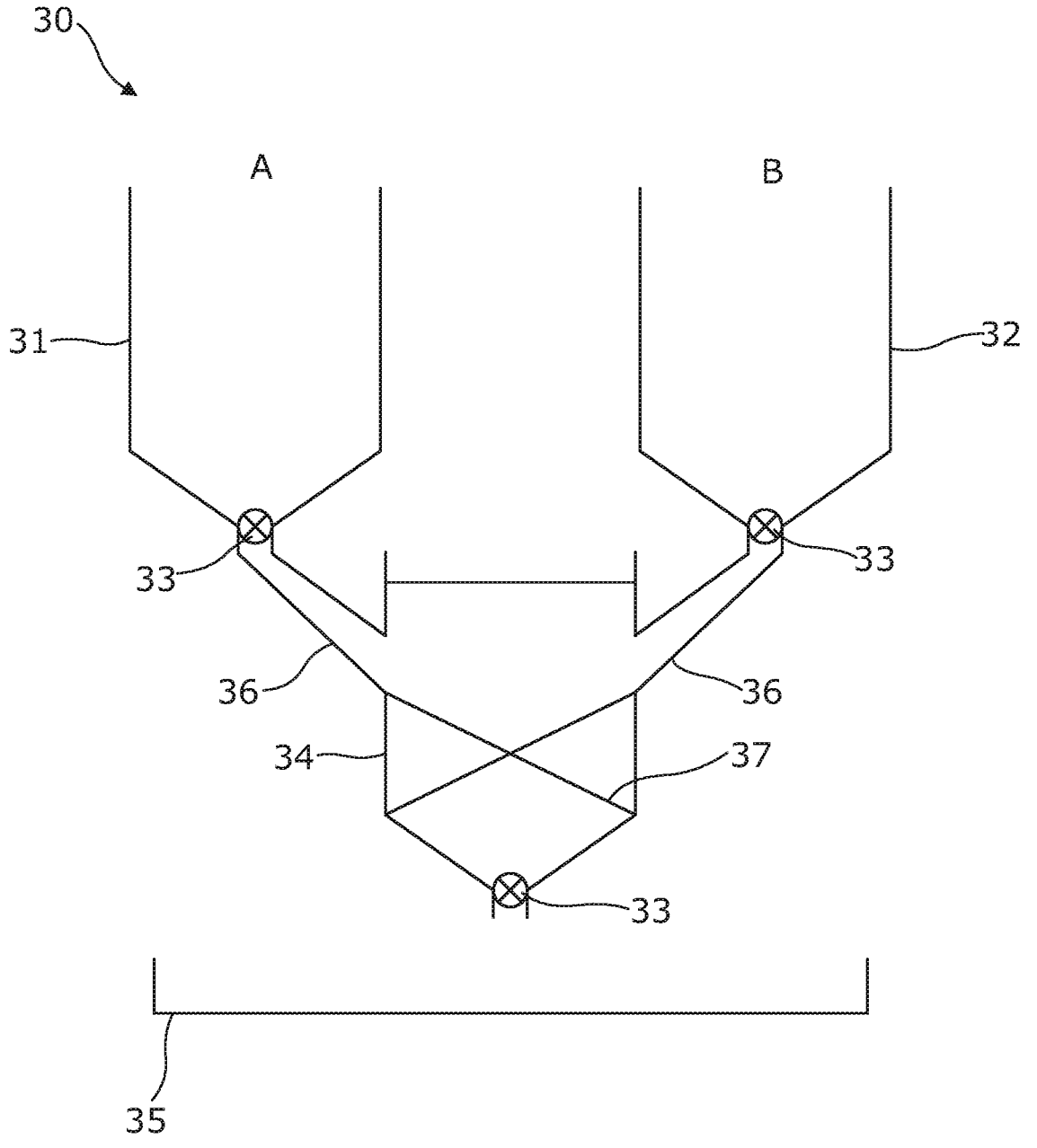
FIG. 4 shows the apparatus of the third example which additionally comprises a system for blending powder.

In a third example of the invention, and as shown in FIG. 3, there is provided an apparatus 30 that is similar to the apparatus shown in FIG. 1, except that the third container 14 is not moveable to a positon below the first container 11 and/or the second container 12. Instead, the third container 34 is held in a fixed position above the build platform 35 and is connected to the first container 31 and second container 32 via chutes 36. In use, powder from the first container 31 and/or powder from the second container 32 is dispensed into the third container 34 via the respective electronic valves 33 and chutes 36. This powder blend is then dispensed onto the build platform 35 and formed into a layer in the same manner as described hereinabove. In another example of the invention, and as best shown in FIG. 4, the third container 34 is provided with a system 37 which is configured to promote the mixing of powder A and powder B prior to the blend being dispensed onto the build plate.

The above embodiments are described by way of example only. Many variations are possible without departing from the scope of the invention.

The invention claimed is:

1. An apparatus for producing an article by additive manufacturing comprising:

a) a first container and a second container from which metal powder may be selectively dispensed in powder form to produce an article, wherein the first container contains a quantity of a non-recycled metal powder or a quantity of a first recycled metal powder and the second container contains a quantity of a second recycled metal powder that has been recycled to a different extent to the first recycled metal powder, and wherein each of the non-recycled metal powder or the first recycled metal powder and the second recycled metal powder are the same type of metal powder, and b) a control unit configured to control the quantity of the non-recycled metal powder or the quantity of the first recycled metal powder dispensed from the first container and the quantity of the second recycled metal powder dispensed from the second container, wherein the control unit is configured to dispense a greater proportion of the quantity of the non-recycled metal powder or the quantity of the first recycled metal powder when predicted stress in a certain region of the article is higher, and the control unit is configured to dispense a greater proportion of the quantity of the second recycled metal powder when the predicted stress in a certain region of the article is lower.

2. An apparatus according to claim 1, wherein the first container and the second container respectively contain the quantity of the first recycled metal powder and the quantity of the second recycled metal powder.

3. An apparatus according to claim 1, wherein the apparatus is arranged to dispense the quantity of the non-recycled metal powder or the quantity of the first recycled metal powder from the first container and/or the quantity of the second recycled metal powder from the second container onto a build platform.

4. An apparatus according to claim 1, wherein the apparatus is arranged to dispense the quantity of the non-recycled metal powder or the quantity of the first recycled metal powder from the first container and/or the quantity of the second recycled metal powder from the second container directly onto a build platform.

5. An apparatus according to claim 1, wherein the apparatus is arranged to dispense the quantity of the non-recycled metal powder or the quantity of the first recycled metal powder from the first container and/or the quantity of the second recycled metal powder from the second container onto a build platform via a third container.

6. An apparatus according to claim 5, wherein the third container is configured to enable mixing of the quantity of the non-recycled metal powder or the quantity of the first recycled metal powder dispensed from the first container and the quantity of the second recycled metal powder dispensed from the second container.

7. An apparatus according to claim 1, wherein the quantity of the non-recycled metal powder or the quantity of the first recycled metal powder from the first container and/or the quantity of the second metal powder from the second container is dispensed onto a build platform via respective delivery platforms.

8. An apparatus according to claim 1, wherein the control unit is configured to vary the quantity of the non-recycled metal powder or the quantity of the first recycled metal powder dispensed from the first container and the quantity of the second recycled metal powder dispensed from the second container for each layer of the article.

9. An apparatus according to claim 1, wherein the quantity of the non-recycled metal powder or the quantity of the first recycled metal powder in the first container and the second recycled metal powder in the second container comprises a metal alloy.

* * * * *